W. N. ALLAN.
VEHICLE WHEEL.
APPLICATION FILED FEB. 21, 1920. RENEWED JAN. 31, 1921.
1,389,473.
Patented Aug. 30, 1921.
2 SHEETS—SHEET 1.
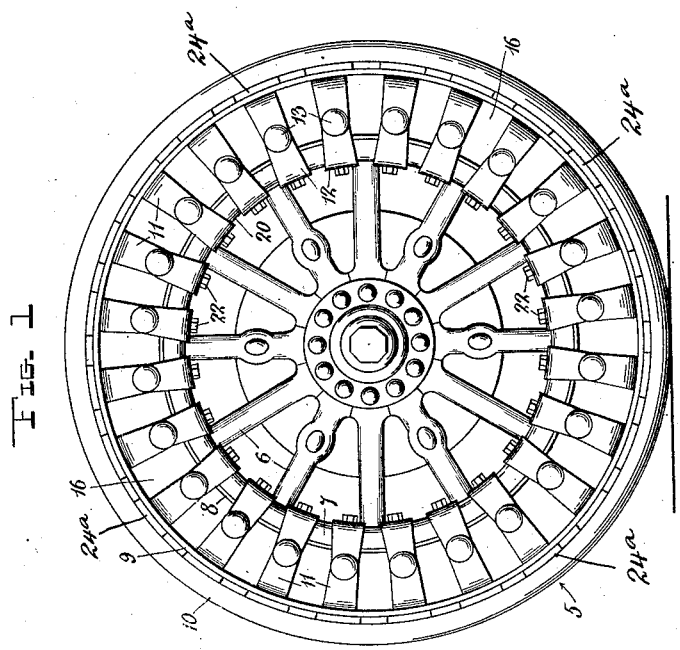
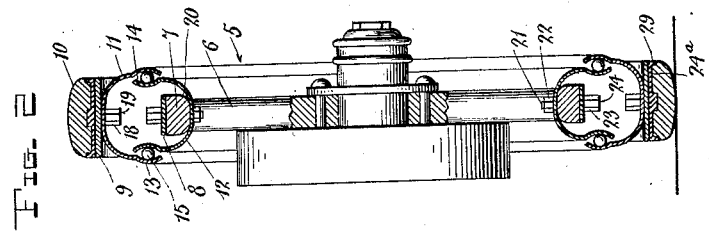
WITNESSES:
INVENTOR
William N. Allan,
BY
ATTORNEY

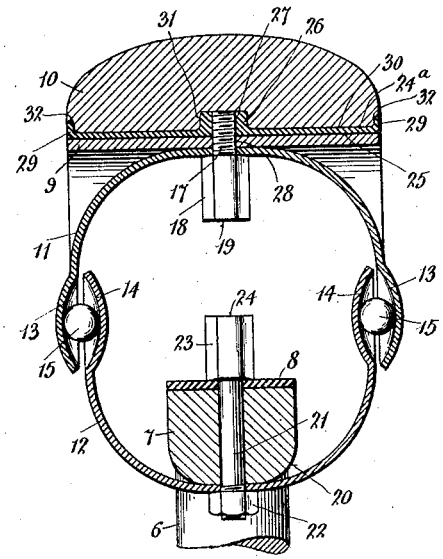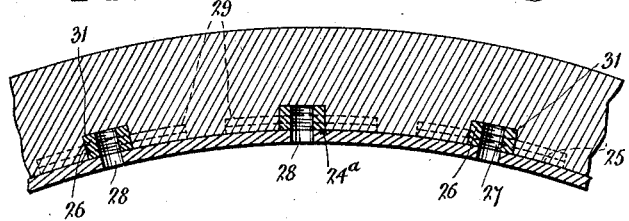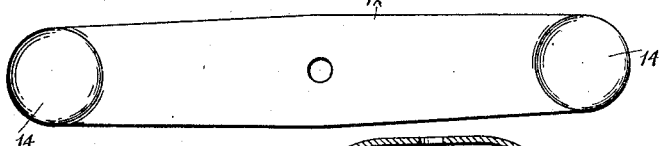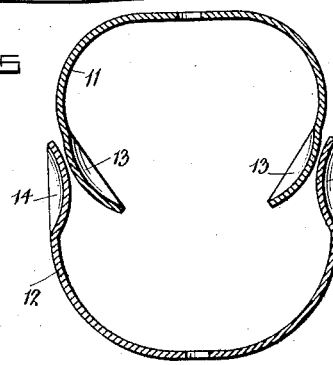

UNITED STATES PATENT OFFICE.

WILLIAM N. ALLAN, OF SAN ANTONIO, TEXAS.

VEHICLE-WHEEL.

1,389,473.  Specification of Letters Patent.  Patented Aug. 30, 1921.

Application filed February 21, 1920, Serial No. 360,423. Renewed January 31, 1921. Serial No. 441,456.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The improved tire embodying the subject matter of the present invention is of a simplified spring cushion type wherein a series of spring bearing units are interposed between the wheel felly and the tread and provided with overlapping socketed extremities with intermediate freely movable anti-frictional means engaging the same, and having the dual function of a connecting instrumentality and a medium by which the spring unit extremities are at liberty to longitudinally slide or shift relatively to each other, and also torsionally move, and laterally sway, to compensate for the various regular and irregular pressure stresses to which a tire is subjected during travel over a road surface. A further purpose of the improved tire structure is to provide for a sensitively resilient and easy riding action, and to take up and completely absorb shocks and jars, however strenuous they may be, without liability of fracturing or disjoining the improved connecting means for the spring extremities. A still further purpose of the improved tire is to so associate or connect the extremities of the spring units as to avoid penetration thereof by securing devices and maintaining them in spaced relation with a minimum of friction in their operation, thereby materially reducing wear on the spring unit extremities, and rendering the latter more durable and efficient in their service, and obviating heating and deterioration thereof. A still further purpose of the improved tire is to provide spring units therefor, with their extremities so associated that the said units will be free to take up shocks and vibrations fully throughout the length of the units, by avoiding restrictions to the relative movement of the spring unit extremities.

The invention consists in the preferred construction and arrangement of the several parts, which will be more fully hereinafter described and claimed.

In the drawings:

Figure 1 is a side elevation of a wheel embodying the improved tire structure.

Fig. 2 is a central transverse vertical section of the improved wheel.

Fig. 3 is an enlarged transverse vertical section through the tire and the felly of the wheel.

Fig. 4 is a detail plan view of one of the spring units.

Fig. 5 is a detail sectional view showing the normal position of one spring unit relatively to the other prior to the operative assemblage of the spring units.

Fig. 6 is a longitudinal section of a portion of the tread organization of the improved tire.

Fig. 7 is a top plan view of one of the tread holding elements.

The numeral 5 designates a wheel of any suitable construction having spokes 6 and a felly 7 which may be of any preferred form, but in the present instance it is shown as having an outer band 8 surrounding and secured to the same. The construction of the wheel and its component felly, however, is not essential and may be varied indefinitely. The improved tire comprises as its main elements an outer surrounding spring band 9, a solid elastic tread 10 and reversely arranged or opposed spring units 11 and 12, formed with spherical sockets 13 and 14 in overlapped relation and held separated and connected by an interposed anti-frictional device or ball 15. The spring units 11 and 12 are regularly disposed around the felly 7, as clearly shown by Fig. 1, and are spaced apart to provide openings 16 therebetween, and whereby the improved tire is thoroughly ventilated. The number of the spring units 11 and 12 applied to the felly 7, and between the latter and the band 9 and tread 10, may be varied and their general dimensions modified in accordance with the character of the wheel with which they are used, or the load that is intended to be imposed upon the wheel.

Various types of fastening means could be used for attaching the spring units 11 and 12 respectively to the band 9 and tread 10 and the felly 7, and for the purpose of illustrating one simple means that may be adopted with advantage, the drawings show each spring unit 11 having a threaded bolt 17 inserted through the center thereof, and through the band 9 and extended part-way into the central portion of the tread 10 in a manner which will be presently explained. The threaded bolt 17 has an inwardly extended elongated head 18 with an inner straight end 19. The spring unit 12 is passed around the inner curved edge or periphery 20 of the felly and is centrally secured by having a threaded bolt 21 passed therethrough and through the felly and held in secured position by a nut 22 bearing against the inner side of the center of the spring unit 12. The head 23 of the bolt 21 projects outwardly from the band 8 on the felly 7, and is of elongated form and has an outer straight end 24. The curved inner edge or periphery 20 of the felly 7 permits the spring unit 12 to freely operate without liability of coming into contact with sharp edges or of being restricted in its action, and hence friction or injury to said spring unit, at the portion thereof in engagement with the felly, is reduced to a minimum.

Each spring unit 11 or 12 is primarily straight, as shown by Fig. 4, and bowed and given a normal fixed curvature by tempering. The spring unit 11 is of the normal shape shown by Fig. 5 and the extremities are sprung outwardly over the extremities of the unit 12 so as to dispose the sockets 13 and 14 in proper relative positions, and whereby actual disjointure of the associated sockets 13 and 14 and balls 15 will be prevented, no matter how great may be the shock or vibration imposed on the tire. Separation or disjointure of the extremities of the spring units is also prevented by the elongated heads 18 and 23 of the threaded bolts 17 and 21, the said bolt heads being in alinement and elongated to such an extent as to come into contact when the tire is subjected to severe pressure stress. The length of the bolt heads 18 and 23 will be practically considered and regulated in accordance with the maximum compression action of the spring units, or said bolt heads will engage when the maximum compression movement of the units is reached. Under ordinary compression conditions to which a tire is subjected, the spring units 11 and 12 will operate freely without engagement of the bolt heads 18 and 23, and said heads only come together or have engagement when very unusual pressure stresses affect the tire.

The improved tire will be found exceptionally sensitive in its resilient action, and in view of the absence of penetrative connecting devices or similar constructive means at or between the overlapped extremities of the spring units, the latter will not only be free to operate to compensate for compression of the spring units, and torsional and lateral swaying movements thereof, but will be free of heating and metal crystallization, thereby rendering them more strong and durable and practical as a wheel tire cushioning means.

The improved tire is augmented in its resiliency by the spring band 9 which continuously and completely surrounds the inner portion or base of the tread 10, the said spring band materially assisting in the restoration of the parts of the tire to normal position, after they have been relieved of compression stress or strain. The improved tire also embodies means for reliably securing the solid tread 10 in place, and retaining said tread in positive association over the spring band under the most strenuous action thereon during service.

The tread 10 and the surrounding spring band 9 have means associated therewith for holding the said tread in place against longitudinal creeping, and lateral movement relatively to the band, this means being disposed radially opposite the outer spring units 11 fully around the wheel tire. The preferred means for the purpose just explained consists of a keeper plate 24$^a$, shown in detail by Fig. 7, and having a curved under-side 25 corresponding to the curvature of the outer side of the band 9. Each of the keeper plates 24$^a$ has a central boss 26, with a screw threaded socket 27 extending therethrough to receive the threaded bolt 17, which also passes through opening 28 in the band 9 with which the socket 27 alines when the plate 24$^a$ is disposed in proper position on the band 9. Each plate 24$^a$ diverges from the boss 26, which is located in the center, toward the opposite ends of the plate, outwardly projecting flanges 29 being formed at the outer widened ends of the plate. The plates 24$^a$ are arranged transversely with relation to the band 9 and are of the same length as the width of the band 9 so as to form at their ends a flush fitting with the opposite side edges of said band. As shown by Figs. 3 and 6, the base of the tread 10 is formed or molded at intervals with transversely extending seats 30 having counter recesses 31 at the centers thereof and outer shallower recesses 32 opening through the opposite sides of the tread. These seats 30 and the recesses 31 and 32 are of the same contour as the plates 24$^a$, bosses 26 and flanges 29, in order that they may snugly receive the said plates and their structural accessories just specified and almost wholly embed the plates within the tread and inclose them between the latter and the band 9, except the opposite ends where the flanges 29 are formed. The portions of the tread 10 between the seats 30 have direct bearing on the outer surface of the band 9, and when the tread is applied over the band and plates it is securely held in place and strengthened, and provision is also made for positively attaching the screw bolts 17. The screw bolts 17 prevent the plates 24ª from shifting lengthwise over the band 9, and the tension of the tread prevents the plates from having a turning movement. Hence the plates effectually coöperate with the tread 10 to prevent shifting movement of the latter and provide a very simple means for securely holding the tread on the band 9. Moreover the location of the plates 24ª directly over the point of application of the intermediate portions of the spring units 11 to the band 9 strengthens the band and the tire as a whole by increasing the thickness of metal at the points around the tire where the compression stress though the tread is imposed on the said spring units 11. The employment of the plates 24ª directly engaging the spring band overcomes the necessity of constructing and using a channel tread rim or holding means, and the tread portion of the tire is materially lightened by a reduction in the use of metal without detracting from the necessary strength, and at the same time the tread may be applied over the band 9 and positively secured by a very simple operation. By reducing the width of the central portions of the several plates a more advantageous association thereof with the solid elastic or rubber tread 10 results, and a greater extent of the inner surface of the said tread between the plates is also permitted, and whereby the elastic material of the tread may be brought more extensively in contact with the outer surface of the band to provide for a direct resilient coöperation of the band and the portions of the tread engaging the same.

From the foregoing it will be seen that the tire structure as a whole is materially simplified by reducing the number of parts to a minimum and at the same time maintaining the requisite strength and durability.

The improved tire is also readily removable from the felly 7 by contracting the extremities of the spring units 12 sufficiently to detach the same and balls 15, and, subsequently, the tire may be replaced around the felly by a contraction of the extremities of the spring unit 12 and a placement of the balls 15 between the socketed extremities 13 and 14 of the spring units 11 and 12. If it is found necessary at any time to replace anyone of the spring units 11 and 12, such replacement may be readily accomplished by disconnecting the fastening or screw bolt 17 holding said unit in place, and afterward securing the substituted unit by the same fastening device or bolt. This replacement of the spring units will be very rarely, if at all, required, but by following the foregoing procedure it is obvious that a substitution may be readily made.

What is claimed as new is:

1. A tire comprising opposing spring units with overlapping freely movable extremities, and anti-frictional connecting means interposed between the said extremities.

2. A tire comprising opposing spring units having overlapping socketed extremities disposed to have longitudinal and swaying movements relatively to each other, and anti-frictional connecting means interposed between and engaging the socketed extremities.

3. The combination with a wheel felly and a tread organization, of reversely arranged spring units respectively secured to the felly and tread organization and having overlapping freely slidable extremities, and anti-frictional connecting means interposed between and engaging said extremities.

4. The combination with a felly and a tread device, of a continuous spring band extending around the inner side of the tread device, opposing spring units secured to the felly and spring band and tread device and having overlapping freely movable extremities, and anti-frictional connecting means interposed between and engaging said extremities.

5. A tire comprising opposing spring units having overlapping freely movable extremities, the one spring unit of each group being primarily contracted and the other spring unit of the same group being normally bowed, the contracted unit being expanded to dispose its extremities outside of the extremities of the normally bowed unit, and anti-frictional connecting means interposed between and engaging the overlapping extremities of the spring units.

6. A tire comprising a yielding tread device formed with seats and recesses at intervals in the inner side thereof, transversely arranged plates converged from opposite ends inwardly toward the centers thereof to reduce the width of the same at the centers and engaging the said seats and recesses and terminating flush with the opposite side edge portions of the tread device, and means on which the said plates are mounted, the said means being engaged by the portions of the tire between the plates.

7. A tire comprising a spring band, a plurality of transversely extending plates converged from opposite ends inwardly toward the centers thereof to reduce the width of the same at the centers and mounted on the band and terminating flush with the opposite side edges of the latter, and a tread device having transversely extending seats and recesses in the inner side thereof to receive the said plates, portions of the tread device between the plates bearing upon the spring band.

8. A tire comprising a spring band, a plurality of plates extending transversely over the outside of the band and engaging the latter, the said plates having outer terminal flanges and center bosses, and a tread device having transversely extending seats and central and outer recesses to receive the plates and their flanges and bosses.

9. A tire comprising a spring band, a series of retention plates extending transversely over the band forming part of the tread organization of the tire and diverging from the center thereof toward the outer terminals where outwardly projecting flanges are formed, the plates having outwardly extending bosses at the centers thereof, and a tread device having transversely extending seats at the inner side thereof and recesses to receive the plates and their flanges and bosses.

10. The combination with a felly, of a band surrounding the felly at a distance therefrom and having a plurality of transversely extending plates thereon, the plates being formed with center bosses having screw sockets, a tread device having an inner formation to receive the plates and engage the band, spring units between the felly and the band, and fastening devices extending through the outer spring units and band and engaging the said bosses.

11. The combination of a felly and an outer tread organization surrounding the felly, reversely arranged spring units interposed between and connected to the felly and tread organization and having overlapping freely movable extremities provided with anti-frictional connecting means, and fastening devices for the spring units having opposing heads with the ends thereof in alinement for direct engagement with each other to restrict the compression of the spring units, an unobstructed clear space being formed between the opposing heads of the fastening devices.

12. As an improved article of manufacture, a spring unit for a wheel tread organization having spherical sockets directly formed in opposite ends thereof, the spring unit being adapted to be bowed to bring the spherical sockets in opposed positions.

In testimony whereof I have hereunto set my hand.

WILLIAM N. ALLAN.